United States Patent
Remy et al.

(10) Patent No.: US 11,874,889 B2
(45) Date of Patent: Jan. 16, 2024

(54) METHOD FOR GENERATING A COMPOSITE VISIBILITY INDICATOR FOR AN ENTITY, SYSTEM

(71) Applicant: DEEPREACH, Paris (FR)

(72) Inventors: Jean-Pierre Remy, Paris (FR); Benjamin Reverend, Paris (FR); Jean-François Paccini, Paris (FR); Pierre-André Pochon, Paris (FR)

(73) Assignee: DEEPREACH, Paris (FR)

( * ) Notice: Subject to any disclaimer, the term of this patent is extended or adjusted under 35 U.S.C. 154(b) by 113 days.

(21) Appl. No.: 17/616,318

(22) PCT Filed: Jun. 5, 2020

(86) PCT No.: PCT/EP2020/065741
§ 371 (c)(1),
(2) Date: Dec. 3, 2021

(87) PCT Pub. No.: WO2020/245437
PCT Pub. Date: Dec. 10, 2020

(65) Prior Publication Data
US 2022/0309119 A1    Sep. 29, 2022

(30) Foreign Application Priority Data
Jun. 6, 2019    (FR) ...................................... 1906050

(51) Int. Cl.
*G06F 16/9537* (2019.01)
*G06F 16/906* (2019.01)

(52) U.S. Cl.
CPC ........ *G06F 16/9537* (2019.01); *G06F 16/906* (2019.01)

(58) Field of Classification Search
CPC .... G06Q 50/01; G06Q 30/02; G06Q 30/0201; G06Q 30/0205; G06Q 30/0263;
(Continued)

(56) References Cited

U.S. PATENT DOCUMENTS 7,822,705 B2 * 10/2010 Xia .......................... G06F 16/22
707/791
8,538,956 B1 * 9/2013 Szabadka ................ G06F 16/29
707/723
(Continued)

FOREIGN PATENT DOCUMENTS

WO    WO 2007/027608 A2    3/2007

OTHER PUBLICATIONS

International Search Report as issued in International Patent Application No. PCT/EP2020/065741, dated Jul. 9, 2020.

*Primary Examiner* — Kimberly L Wilson
*Assistant Examiner* — Cheryl M Shechtman
(74) *Attorney, Agent, or Firm* — Pillsbury Winthrop Shaw Pittman LLP

(57) ABSTRACT

A method for generating a composite visibility indicator of at least one entity includes selecting a first category of entities; selecting a first position; associating the first position with a first geographical zone, said first geographical zone defining a zone around the first position as a function of the selected category; generating at least one request to collect a plurality of indicators, and generating a composite visibility indicator for each entity of the first category selected within the first zone, the visibility indicator being a function of the first indicator and of the second indicator.

20 Claims, 7 Drawing Sheets

Figure 1:
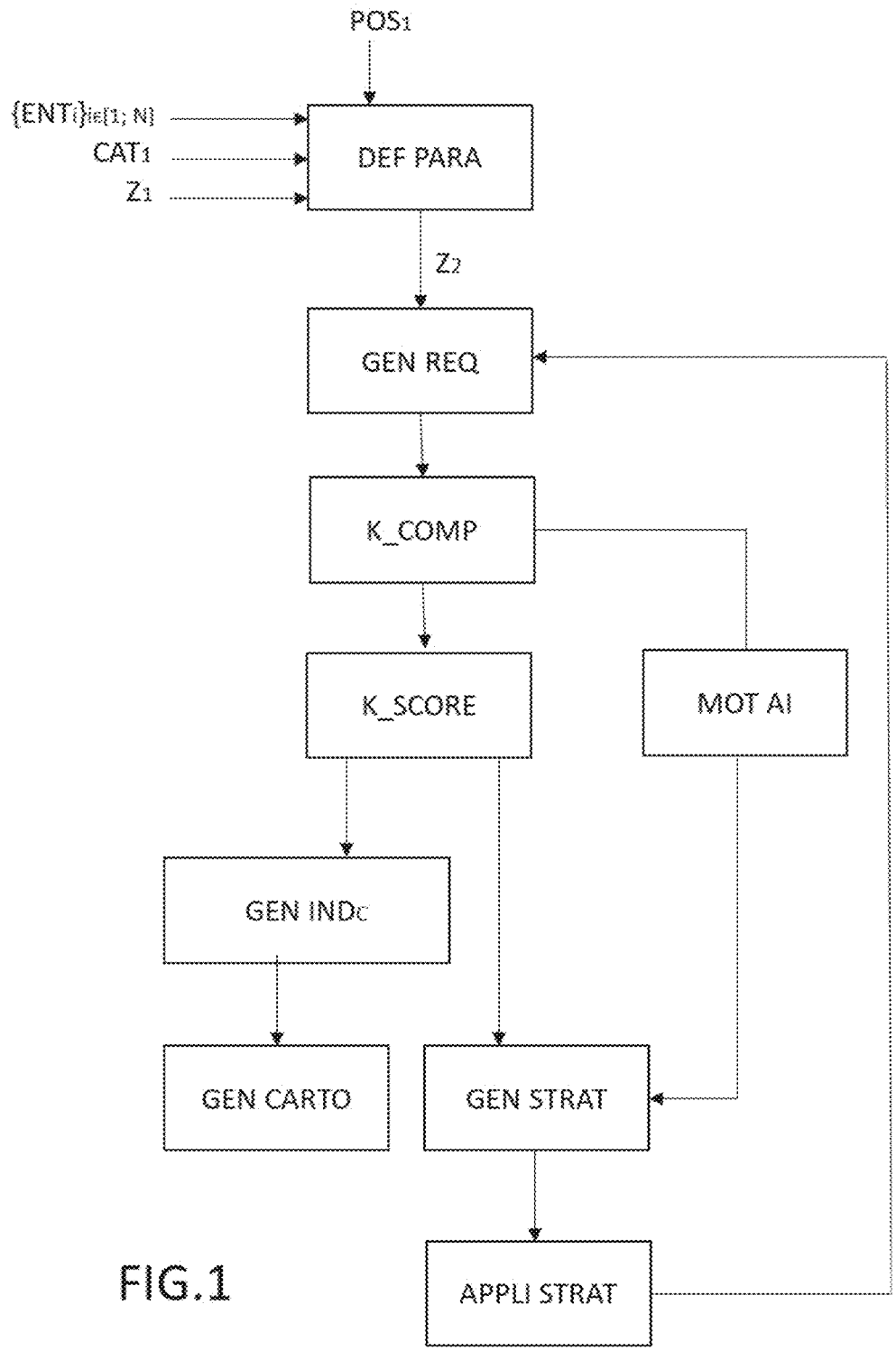

(58) Field of Classification Search
CPC ........... G06Q 30/0269; G06Q 30/0282; G06Q 30/0631; G06F 16/24578; G06F 16/248; G06F 16/29; G06F 16/444; G06F 16/906; G06F 16/951; G06F 16/9535; G06F 16/9537; G06F 3/0482
See application file for complete search history.

(56) References Cited

U.S. PATENT DOCUMENTS

| | | | | |
|---|---|---|---|---|
| 8,898,173 B1* | 11/2014 | Badoiu | ............... | G06F 16/9537 707/748 |
| 2013/0129060 A1* | 5/2013 | Gopalakrishnan | ............................ | G06Q 30/0244 379/93.01 |
| 2014/0040236 A1* | 2/2014 | Vijaywargi | ......... | G06F 16/9537 707/E17.014 |
| 2015/0058328 A1* | 2/2015 | Fu | ........................... | G06F 16/00 707/723 |

* cited by examiner

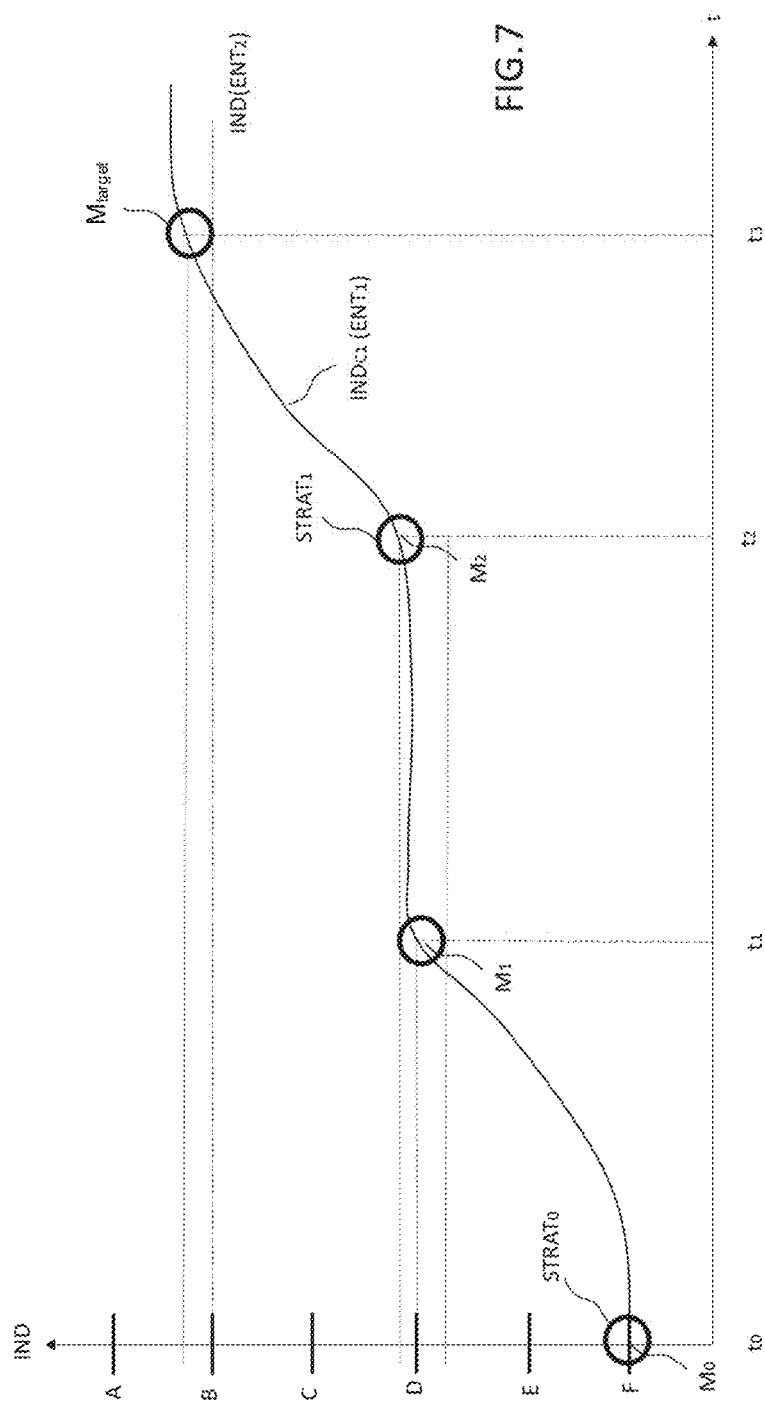

METHOD FOR GENERATING A COMPOSITE VISIBILITY INDICATOR FOR AN ENTITY, SYSTEM

CROSS-REFERENCE TO RELATED APPLICATIONS

This application is the U.S. National Stage of PCT/EP2020/065741, filed Jun. 5, 2020, which in turn claims priority to French patent application number 1906050 filed Jun. 6, 2019. The content of these applications are incorporated herein by reference in their entireties.

The field of the invention relates to methods for evaluating and improving visibility in a data network of an entity such as a banner in a geographical zone: The field of the invention relates to methods and systems generating a visibility indicator of said entity.

There are solutions aimed at generating visibility indicators of an entity such as solutions implementing methods for evaluating the performance of referencing within a search engine. Search engines, such as Google or Bing, make it possible to draw up lists of responses sequenced according to a set of search criteria. Thus, it is possible to obtain information about the rank of appearance of a name of said entity among all the results displayed in the search.

Tools, such as Page Rank published by the search engine Google, allow the referencing of a URL to be evaluated by counting the inbound and outbound links towards a web page of said URL evaluated.

However, these solutions are unsatisfactory for evaluating the visibility of a banner in a data network, such as the Internet, when one wishes to limit oneself to a region and more generally to a geographical trading zone. When a local URL of the banner exists, a grading could be performed from a tool such as Page Rank, however, this grading reveals a visibility that does not take account of the specificities of a geographical zone, in particular the density of entities in this same zone.

There is a need to evaluate visibility of an entity in a data network when one wishes to limit this evaluation to a given geographical zone.

The invention detailed below makes it possible to overcome the aforementioned drawbacks.

According to one aspect, the invention relates to a method for generating a composite visibility indicator of at least one first entity comprising:
Selecting a first category of entities;
Selecting a first position;
Associating said first position with a first geographical zone, said first geographical zone defining a zone around the first position based on the selected category;
Checking a georeferencing on a digital mapping accessible from a data network of a digital resource locator, said digital resource locator pointing to a resource associated with the first entity;
Generating at least one request to collect:
  A first indicator qualifying a quantified digital assessment of the first entity in the first zone on a predefined scale, said assessment resulting from a set of assessments from a set of users and being generated on a data page of the first network;
  A second indicator of the existence of at least one resource comprising a first web page referencing data associated with the first entity and with at least one position of the first zone or with the first zone;
Generating a composite visibility indicator for each entity of the first category selected within the first zone, said visibility indicator being a function of the first indicator and of the second indicator.

One advantage is to make it possible to obtain a local visibility indicator for an entity having, for example, several geographical locations. Another advantage is to allow standardization of an indicator allowing comparisons of different indicators of different entities in the same zone and in the same category.

According to one aspect, the invention relates to a method for generating a composite visibility indicator of at least one first entity within a data network comprising connected equipment storing digital resources designating entities, each entity being accessible from a digital resource locator within the data network comprising:
Selecting a first category of entities from a user interface, each category being defined in at least one database of a server of the data network;
Selecting a first position from a user interface;
Associating said first position with a first geographical zone, said first geographical zone defining a zone around the first position based on the selected category;
Checking a georeferencing on a digital mapping accessible from a data network of a digital resource locator, said digital resource locator pointing to a resource associated with the first entity;
Automatically generating at least one request from a calculator to collect data from at least one remote database and calculate from said collected data and a calculator:
  A first indicator quantifying a set of texts associated with grades of a set of users, said set of texts being digitally associated within a database with the first entity in the first zone, said quantification being performed on a predefined scale, said set of texts associated with grades being generated on at least one data page of the first network;
  A second indicator of the existence of at least one resource comprising a first web page referencing data associated with the first entity and with at least one position of the first zone or with the first zone;
Generating a composite visibility indicator for each entity of the first category selected within the first zone, said visibility indicator being a function of the first indicator and of the second indicator.

The steps of the method can be performed from a user interface in particular to select the input data. This interface can be that of a computer or an electronic terminal. Furthermore, a first calculator can be used to generate the requests, for example that of a computer or an electronic terminal. A second calculator can be implemented to calculate the indicators. It may be for example a calculator of a remote server. The visibility indicator may be calculated locally on a computer or electronic terminal or remotely.

According to one embodiment, the first indicator further comprises a measurement of a number of texts, each text being associated with an author and with an entity of the first category selected within the first zone.

One advantage is to enrich calculation of the first indicator by taking account of a quantitative piece of data qualifying the grade related to the quantitative assessment.

According to one embodiment, the second indicator further comprises a criterion of technical performance of the first web page and/or a criterion of accessibility of the first web page. One advantage is to enrich the calculation of the second indicator by taking account of the content of the web page. The invention advantageously allows for qualitative and quantitative quantification of the content of a WEB page.

According to one embodiment, the criterion of technical performance of the first VVeb page comprises a first criterion of loading time of the web page, a second criterion of refresh time of the web page, a third criterion of the weight in bytes of the web page, and/or a fourth criterion of compatibility with a terminal. One advantage is to measure a standardized indicator taking different quantifiable criteria into consideration.

According to one embodiment, the criterion of accessibility of the first web page comprises a first criterion of adaptability of the font size of a content of the web page.

According to one embodiment, the method for generating a composite visibility indicator comprises collecting a third indicator of a position of a digital resource locator within a ranking of resource locators, said resource locator comprising at least one link pointing to a web page associated with the first entity, said composite visibility indicator being a function of the third indicator. One advantage is to take account, in the visibility indicator, of a referencing criterion within a data set accessible from a data network.

According to one embodiment, the method for generating a composite visibility indicator comprises collecting a fourth indicator of a presence of a digital resource locator pointing to a web page associated with the first entity, said digital resource locator being generated at a predefined position within a results page produced by a search engine whose search criteria include information related to the first zone and information related to the first entity, said composite visibility indicator being a function of the fourth indicator. One advantage is, for example, to measure the presence of a predefined space dedicated to referencing a link pointing to a WEB page.

According to one embodiment, the generation of the digital resource locator is activated according to at least one criterion of the user profile. One advantage is to evaluate in the calculation of the visibility indicator the taking account of data related to the user profile to generate certain indicators.

According to one embodiment, the method for generating a composite visibility indicator comprises collecting a fifth indicator of a presence of a digital resource locator pointing to a digital resource associated with the first entity, said digital resource locator being generated at a predefined position within a web page produced by a search engine whose search criteria include information related to the first zone and information related to the first entity, said digital resource locator being generated on a display of a mobile terminal, said composite visibility indicator being a function of the fifth indicator. One advantage is to take account of the type of browser and/or terminal in measuring the visibility index.

According to one embodiment, the method for generating a composite visibility indicator comprises collecting a sixth indicator of a value quantifying a traffic at a position corresponding to that of the first entity, said traffic being measured from the determination of the position of a set of terminals with a geolocation function activated, the sixth indicator being calculated from a standardized value of the value quantifying the traffic, said composite visibility indicator being a function of the sixth indicator. One advantage is to take a traffic measurement into consideration in order to make the calculation of the visibility indicator more effective.

According to one embodiment, the standardized value of the value quantifying the traffic is established from a plurality of traffic measurements of entities of a same first category in the same first zone. One advantage is to create an indicator that is relative and specific to each zone and category.

According to one embodiment, the method is reiterated for a plurality of entities of a same category, in a predefined geographical zone, a set of composite visibility indicators being generated. One advantage is to generate, on the same mapping, elements of comparison between the visibility of different entities.

According to one embodiment, the method for generating a composite visibility indicator comprises generating a first mapping whose distance resolution is defined according to the size of the first zone and whose centering is a function of the given position, the method comprising for each entity present in the first zone, generating a graphic symbol at a given position, said given position being extracted from the georeferencing of the digital resource locator associated with said entity, each graphic symbol including a digital piece of data corresponding to a score associated with the composite visibility indicator. One advantage is to improve reading of the indicators over a suitable geographical portion.

According to one embodiment, the method for generating a composite visibility indicator comprises generating a second mapping whose distance resolution is defined such that a region comprising a plurality of predefined positions, each predefined position corresponding to a first aeoreferenced entity, the set of first georeferenced entities representing a group, the centering of the represented region being a function of the set of predefined positions, the method comprising for each first entity of the group present in the region, generating a graphic symbol at each given position, each graphic symbol including a digital piece of data corresponding to a score associated with the composite visibility indicator. One advantage is to allow a comparison of the visibilities of different entities of a same banner.

According to one embodiment, the method for generating a composite visibility indicator comprises generating a list of composite visibility indicators, for example of different entities. According to this embodiment, a step of comparing at least one first composite visibility indicator with the other composite visibility indicators is performed to determine a given strategy, a strategy comprising at least one list of actions organized to generate an increase in the value of the score of the first composite visibility indicator. One advantage is to adapt strategy with respect to the scores of each indicator forming the composite visibility indicator.

According to one embodiment, the actions comprise at least one of the actions among which:
Activating a geo-referencing on a given digital mapping;
Activating an accessibility of a digital resource locator of a web page or of a given resource associated with the first entity, said web page or resource being associated with a first zone within a data network;
Creating at least one outbound link on the local page $PW_1$;
Creating at least one link pointing to the local page $PW_1$;
Activating an interactive component on the local page $PW_1$;
Activating a non-natural referencing;
Activating a non-natural referencing on a given type of terminal,
Modifying at least one keyword of a non-natural referencing.

One advantage is to define enriched strategies with different action levers according to the scores of each indicator forming the composite visibility indicator.

According to one embodiment, at least one strategy is generated according to data from a neural network having, as an input, indicator score data associated with zones and categories, said scores having been previously calculated subsequently to the application of strategies. One advantage is to generate effective strategies taking account of a given category and a given zone.

According to another aspect, the invention relates to a computer program product comprising a calculator and a memory, said program comprising program code instructions executed on a computer for implementing the steps of the method of the invention, said steps being executed by a terminal.

According to another aspect, the invention relates to a terminal comprising a memory, a calculator, a user interface and a communication interface for implementing the steps of the method of the invention. According to another aspect, the invention relates to a system comprising at least one terminal and a data server for implementing the steps of the method of the invention.

According to another aspect, the invention relates to a system comprising at least one terminal and a data server configured to generate a composite visibility indicator of at least one first entity within a data network comprising connected equipment and storing digital resources designating entities, each entity being accessible from a digital resource locator within the data network, said system comprising:

A user interface of an electronic terminal for
    selecting a first category of entities, each category being defined in at least one database of a server of the data network and;
    selecting a first position;
a calculator of a data server for
    associating said first position with a first geographical zone, said first geographical zone defining a zone around the first position as a function of the selected category;
    checking a georeferencing on a digital mapping accessible from a data network of a digital resource locator, said digital resource locator pointing to a resource associated with the first entity,
    Automatically generating at least one request from a calculator to collect data from at least one remote database and calculate from said collected data:
    A first indicator quantifying a set of texts associated with grades of a set of users, said set of texts being digitally associated within a database with the first entity in the first zone, said quantification being performed on a predefined scale, said set of texts associated with grades being generated on at least one data page of the first network;
    A second indicator of the existence of at least one resource comprising a first web page referencing data associated with the first entity and with at least one position of the first zone or with the first zone;
The server being configured to generate a composite visibility indicator for each entity of the first category selected within the first zone, said visibility indicator being a function of the first indicator and of the second indicator.

Figure 2:
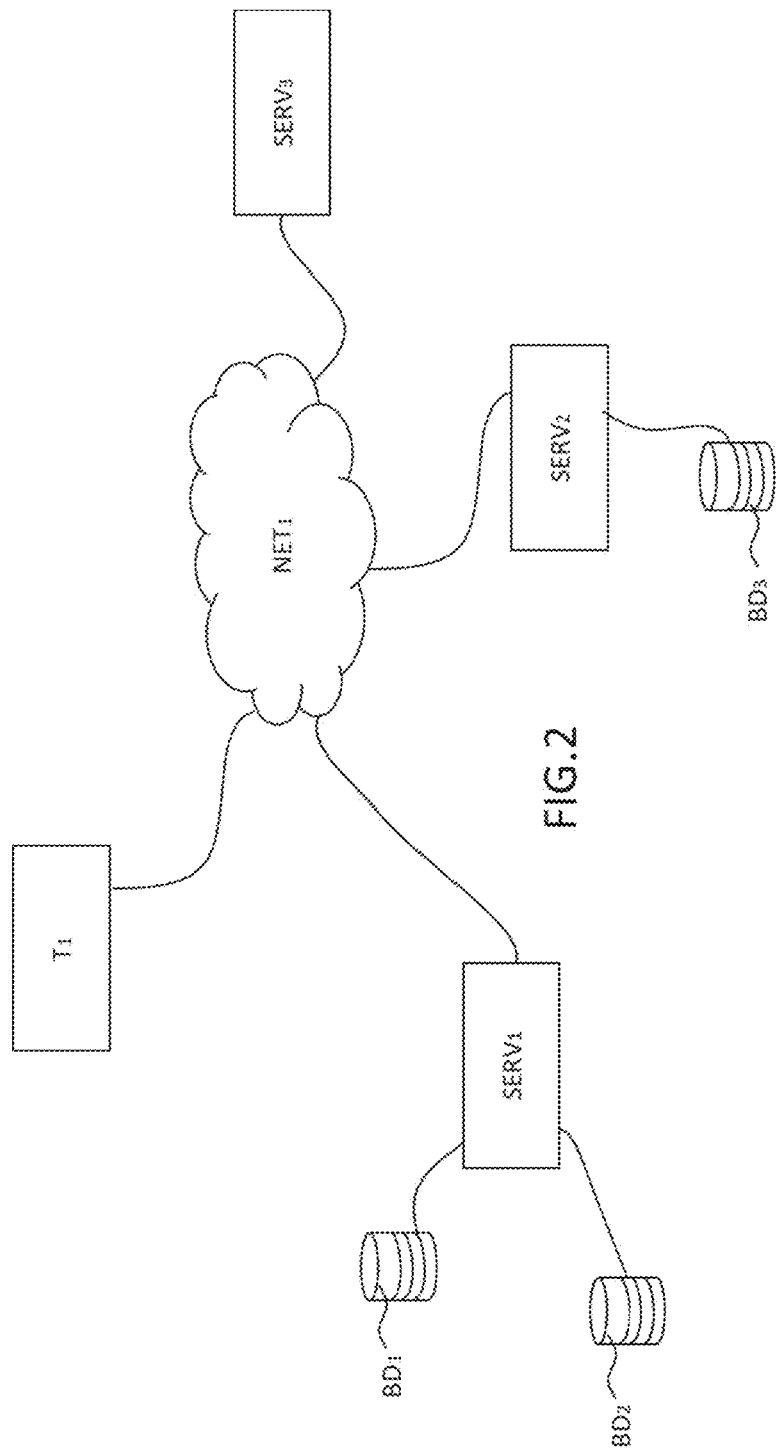
Figure 3:
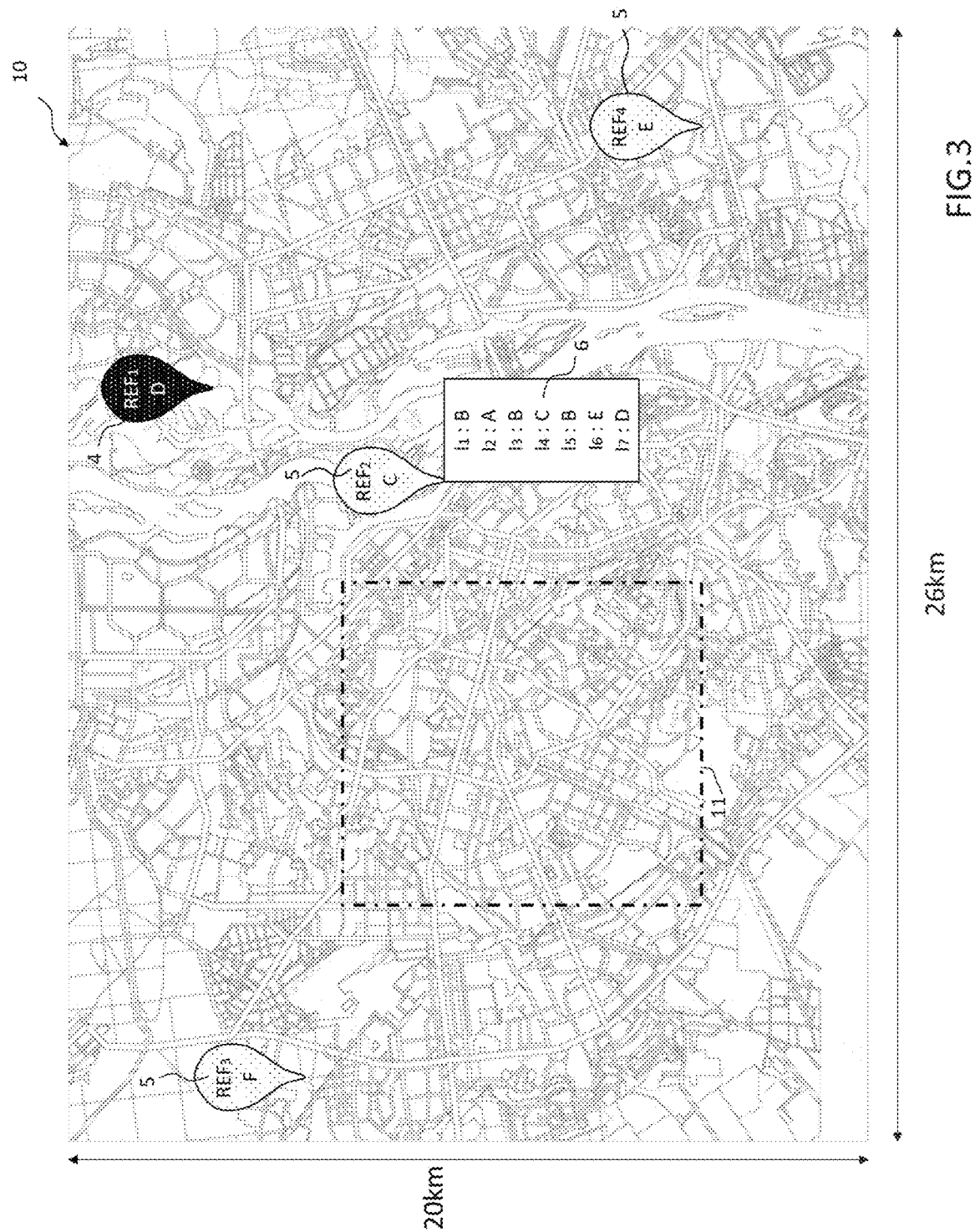
Figure 4:
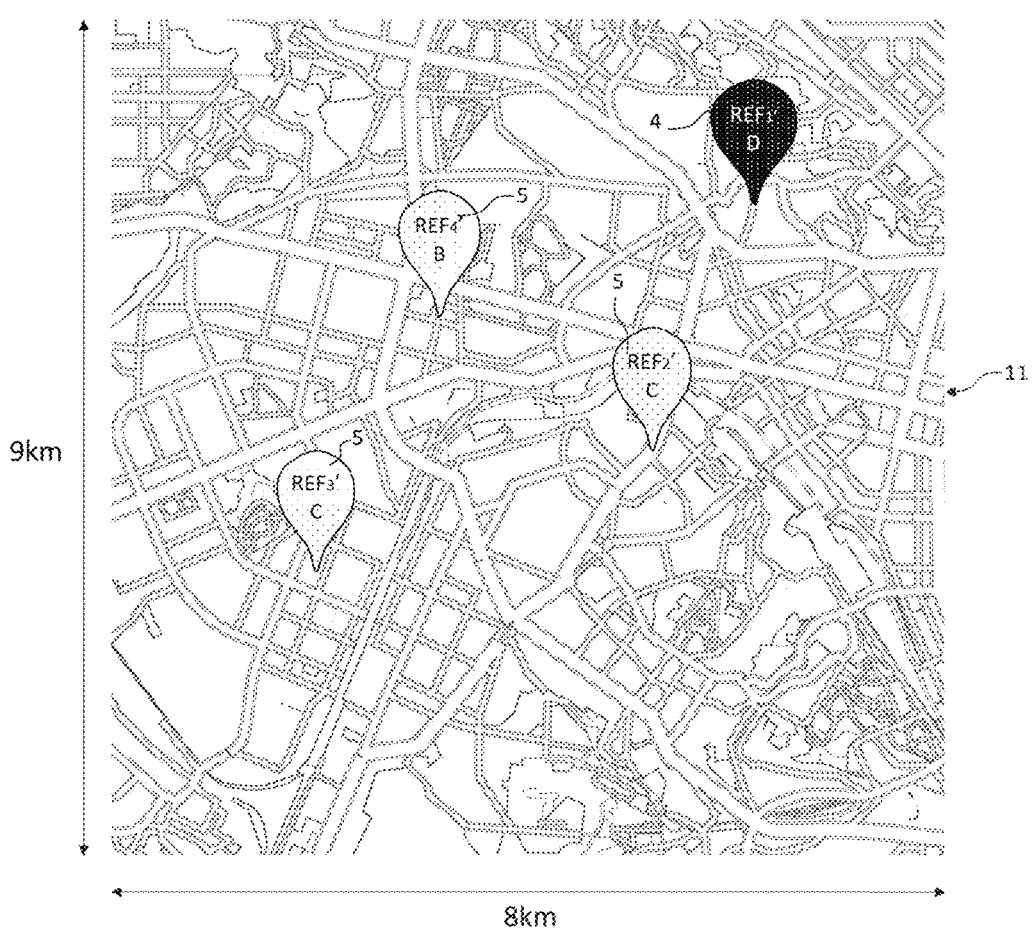
Figure 5:
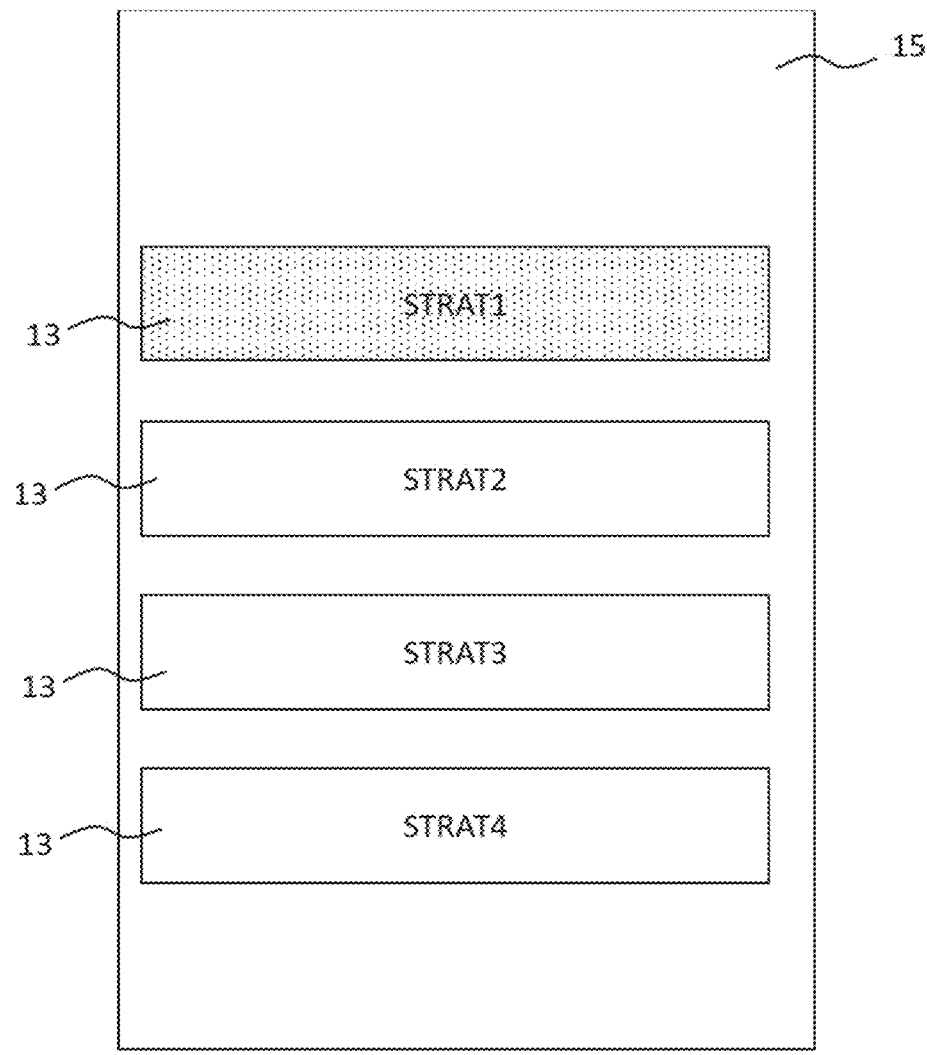
Figure 6:
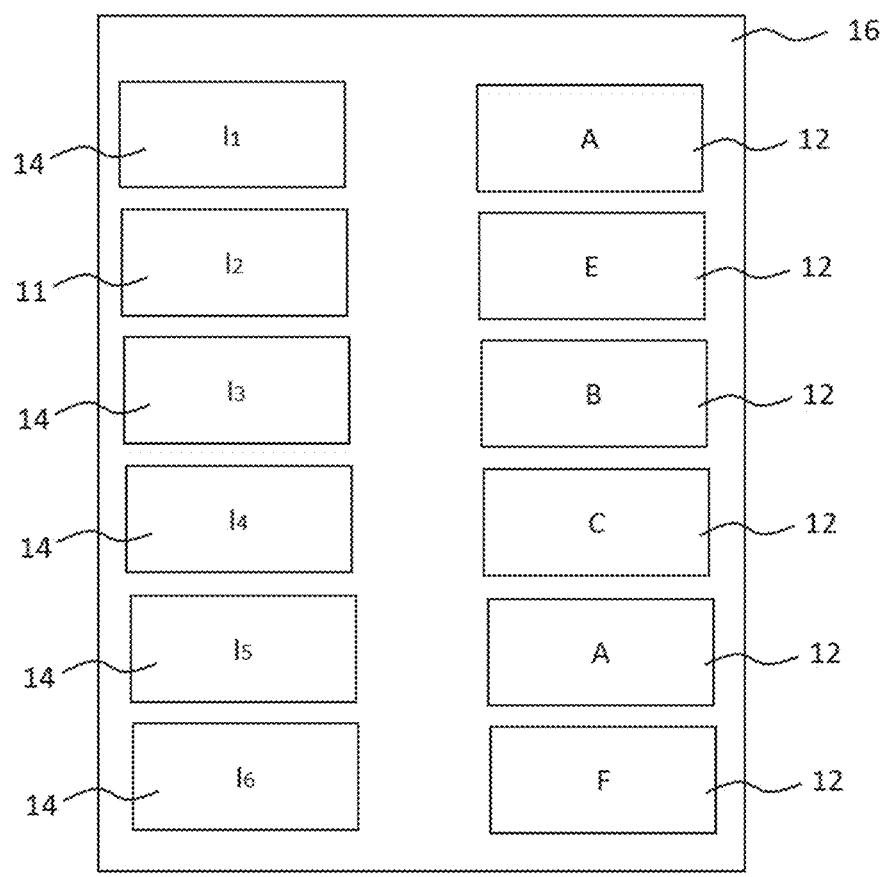

Further characteristics and advantages of the invention will become more apparent from the following detailed description, with reference to the attached figures, which illustrate:

FIG. 1: the main steps of one embodiment of the method of the invention;

FIG. 2: an example of a network architecture for implementing the method of the invention;

FIG. 3: an example of a representation according to a first scale of a map comprising indicators generated according to one embodiment of the method of the invention;

FIG. 4: an example of a representation according to a second scale of a map comprising indicators generated according to one embodiment of the method of the invention;

FIG. 5: an example of a representation of a list of strategies generated from one embodiment of the method of the invention;

FIG. 6: an example of a representation of indicators generated by means of an embodiment of the method of the invention, FIG. 7: an example of a curve generated relating to the course of a composite indicator subsequently to the application of different strategies generated according to one embodiment of the method of the invention.

The present invention aims at determining a visibility indicator of at least one entity $ENT_1$ within a data network $NET_1$. A set of electronic equipment is connected to the data network $NET_1$ such as servers and databases, said databases themselves comprising information specific to a set of entities $\{ENT_1\}_{i \in [1;N]}$. The data network $NET_1$ has an architecture and equipment configured to generate results subsequently to the transmission of requests REQ from another equipment. The data network $NET_1$ is accessible to a plurality of terminals $\{Ti\}_{i \in [1;\ N]}$ of a plurality of users. Each terminal $T_i$ includes a browser to define such requests and display the results of that request. The requests REQ can also be defined from a server accessible by the terminals. The set of entities is, for example, referenced within a database accessible from a server. An application such as a search engine provides access to a set of data that can be used to reference the entities of a geographical zone. One interest of the invention is to generate a composite visibility indicator, denoted as $IND_{C1}$, of a first entity $ENT_1$ for transmitting information on the performance of a referencing. Furthermore, one advantage is to generate mapped information to compare this indicator with generated indicators related to other entities $ENT_1$.

The composite visibility indicator $IND_c$ is calculated from a plurality of visibility indicators $\{I_p\}_{p \in [1;\ N]}$. Each visibility indicator $I_p$ allows one aspect of the visibility of a considered entity $ENT_1$ or $ENT_1$ to be taken into account.

FIG. 1 represents an example of an embodiment of the method of the invention representing different steps for generating a composite visibility indicator $IND_C$. The method comprises a first step DEF_PARA aiming at parameterizing the different data for defining a composite visibility indicator $IND_C$.

This step is, for example, performed using a computer, a smartphone or a digital tablet. The definition of the parameters is performed by a user According to one example, a user interface is used to define a number of parameters. The parameter definition step DEF_PARA can result in defining initial parameters stored on a local memory of the terminal and/or on a remote memory of a server. These parameters can then be replayed automatically when the method is repeated over a period of time.

The first parameter defined in this step DEF_PARA is the name of a first entity, here denoted as $ENT_1$. According to one example, this step allows a plurality of entities $ENT_1$, $ENT_2$, $ENT_3$, etc. to be defined. This can be the name of banners, trademarks, companies or any other name designating a legal entity, a natural person or a name designating a service or a product. This step may include defining a plurality of names for each entity $ENT_i$ when there are several names to designate it, In the remainder of the description, the first entity $ENT_1$ is referred to as the entity that will be selected to determine a composite indicator $IND_{C1}$ that is desired to be compared with other composite indicators INDol in order to generate strategies $\{STRAT_k\}_{k \in [1; P]}$. Each strategy $STRAT_k$ generated comprises a list of actions for modifying the visibility indicators $\{I_p\}_{p \in [1;N]}$ calculated for the first entity $ENT_1$. The interest of a given strategy with respect to another strategy is the possibility to act on a first subset of visibility indicators The invention thus makes it possible to associate subsets of visibility indicators $I_p$ and to associate them with action density or time parameters. Each provided strategy aims at increasing the value of the composite indicator $IND_{C1}$ of the first entity $ENT_1$ with the objective of obtaining a better score than the indicators of the other entities $ENT_1$.

The step of defining the starting parameters DEF_PARA further includes the definition of at least one category $CAT_1$ related to the first defined entity ENT; The category $CAT_1$ can correspond to a category of trade, a field of activity, a code, a trade, a business sector, etc. According to different examples, a category can correspond to bakeries, car repair shops, fast food banners, movies, theaters, cab companies, etc. For each category, a user can configure at least one entity ENT and more generally a plurality of entities $ENT_1$ that define the different operators of the category $CAT_1$.

According to one embodiment, the system of the invention comprises a database including entity data. An entity comprises an identifier, an attribute corresponding to its name and possibly a category. The category is associated with a geographical coverage in order to determine information density information possibly represented on a display. Indeed, the generation of a large number of graphic markers representing entities on a mapping can be detrimental to reading and understanding. Thus, the category makes it possible to automatically generate a distance scale of the mapping respecting a density of entities. To this end, each category can be associated with a density piece of data specific to the entities of this category. Furthermore, the database includes a structure that allows entities to be associated with geographical positions or geographical zones.

The data characterizing entities and categories are thus specially formatted to be stored in a physical memory when such a database is used. The memory is, for example, a database whose architecture allows the data characterizing these entities or categories to be operated. This architecture allows, in particular, data to be automatically extracted in order to automatically generate requests and to generate indicators, in particular a visibility indicator as a function of the information associated with said entity within a data network. Thus, text data associated with grades of a set of users or the existence or not of a web page associated with an entity itself associated with a position, the loading time of a web page, the refresh time of a web page, the size in bytes of the web pages associated with the entities themselves associated with a position, the compatibility of a web page with a browser, a criterion of adaptability of the web pages associated with the entities themselves associated at a position to different browsers, a position piece of data of a digital resource locator within a ranking of resource locators of a resource associated with a web page associated with an entity that is itself associated with a position, can preferably reflect the architecture of the database used so that these data can be extracted and used in calculations by one of the steps of the method of the invention.

By association, it is meant an association in the digital sense, for example performed by a key, an attribute, a link, an address or a rule between two fields of a database or between two fields of two databases.

The method of the invention would produce an equivalent result if the names of the entities or categories were replaced by identifiers, since the visibility of an identifier within a data network would be measured. In particular, this visibility could be measured by quantifying the user interactions associated with these identifiers. In the same way, this consideration makes it possible to measure quantification of the performance of web pages, including for example the loading time, or even a referencing piece of data of an entity within a data network, said entity being able to be reduced to a minimum by a digital identifier. The identifier can be result from encoding a piece of data such as the name in order to discriminate it from another entity.

Finally, the data architecture, the data format and the digital operations performed on the data make it possible to produce an additional technical effect going beyond the normal physical interactions between a computer and a software insofar as a visibility indicator is generated. The latter takes into consideration a quantification of digital user interactions, said interactions being associated with a digital entity. The visibility indicator also integrates a criterion of geographical density of entities of the same category and the existence of a digital resource referencing the entity which is associated with a geographical position.

The invention makes it possible to deliver a data for automatically and digitally quantifying a visibility criterion on a data network of a digital entity. The invention makes it possible to obtain a result in the form of an indicator that makes it possible to deliver an assessment of the visibility of said entity on the data network by an individual. Without the invention, it is difficult for an individual to obtain a standardized indication of the visibility of an entity within a data network, as it would be necessary for the individual to list numerous resources associated with that entity. Furthermore, it would need to evaluate for each entity, their association with positions. Many other operations would be very difficult for an individual to perform from operations on the data network without the production of a standardized indicator.

The method of the invention allows a visibility of an entity within a data network to be quantified so as to automatically measure how the information associated with said data is structured, interactions between users and the data network.

The first step DEF_PARA of the method further includes a step of defining a position denoted as $POS_1$. The position $POS_1$ is possibly the name of a city, of a place, of a district of a city. It can be for exam pie a position defined by GPS coordinates or another positioning system. According to one example, the position is retrieved from a position piece of data previously calculated from a mobile LTE, 4G network or a Wifi network for example by triangulation. In the latter case, the user gives an access authorization to a memory containing his/her position or sends a message through a data network containing his/her current position.

According to one embodiment, this step DEF_PARA comprises defining a geographical zone $Z_1$. This zone corresponds, for example, to a circle around the previously defined position $POS_1$. According to one example, the zone $Z_1$ can correspond to a district, a city or a region around a city.

In one case, the first zone $Z_1$ is directly deduced from the position $POS_1$. According to one example, the first zone $Z_1$ is the position $POS_1$.

According to one embodiment, the scale of the zone $Z_1$ is defined as a function of the category $CAT_1$. In this case, the category $CAT_1$ is associated with a distance scale. This distance scale corresponds, for example, to a trading zone. For example, the category of car repair shops can be associated with a region of up to 50 km, while the category of fast food banners can be associated with a region of up to a few kilometers.

As a result, the definition of a position $POS_1$ and a category $CAT_1$ may cause a zone $Z_1$ to be defined. Furthermore, the position POST makes it possible, for example, to center the zone $Z_1$ around the position POSi. The zone $Z_1$, when automatically deduced from a category CATs and a position $POS_1$, may be modified by a user $U_1$ using an editing interface of the zone $Z_1$. This interface may include display of a mapping and tools for selection, movement, zooming, etc. for navigating within a map and defining an appropriate zone $Z_1$.

The method of the invention includes a step GEN_REC) for generating a request Ri for collecting a set of data from different data sources. The data sources are digital resources such as contents stored in a memory accessible from a digital resource locator. The digital resources can include for example web pages or data accessible from an application. In order to access digital resources, a digital resource locator can be used. In the case of a Web page $PW_1$, the digital resource locator $URN_1$ corresponds to a URL, that is, an access address from a data network $NET_1$, such as the Internet. In the case of an application, the digital resource locator is for example a link within an application.

The data sources are also databases and/or servers. Data sources may also be results produced by an application hosted by a remote server.

A request R can be automatically generated from parameterization defined in the first step DEF_PARA. The request Ri can also be modified by a user $U_1$ before transmitting it.

According to one example, the request Ri comprises a set of requests $R_{12}$, ..., $R_{1N}$. Each sub-request may be considered as sub-requests of the main request $R_1$, with the sub-requests having their own URL. In the latter case, the set of sub-requests is sent to a set of remote servers or databases. The sub-requests aim at generating execution of a script or directly retrieving accessible data in order to process them in order to calculate, firstly, each visibility indicator $I_p$ and secondly a composite visibility indicator $IND_{C1}$.

To perform this step, the method of the invention comprises a preliminary step aiming at configuring a set of data for generating the requests automatically. For this purpose, a preliminary parameterization includes, for example, the definition of the URLs of the requests or filtering data such as data defining update dates.

When a server receives a request, it executes instructions included in the request in order to return a result with the expected data. The data are either collected by a terminal or collected by a central server $SERV_1$ which collects the data from the different requests and produces the calculation of the composite visibility indicator $IND_C$. In the latter case, the central server $SERV_1$ collects the data and retransmits the composite visibility indicator(s) $IND_C$ to the terminal $T_1$ of a first user $U_1$.

The remote servers $SERV_2$, $SERV_3$ and the central server $SERV_1$, hereafter detailed, include calculating means to perform, if necessary, operations on the data to be processed and possibly to extract data from a database and possibly correlate them with other data. Each remote server can be associated with a database to execute instructions of the sub-requests to produce results.

When a single entity $ENT_1$ is defined by a user, the method of the invention includes a step for retrieving a list of entities $ENT_1$ of the selected category $CAT_1$ that is referenced within the zone $Z_1$. According to one example, a data server $SERV_{DATA}$ and/or a database $BD_{DATA}$ include data specific to the entities of each category. According to another embodiment, the entity data $ENT_1$ are automatically aggregated from a search engine.

One advantage is to provide directly the user with a list of entities $ENT_i$ that he/she can validate or complete. In the latter case, the entities $ENT_i$ included in the database can be enriched over time by collecting data from a data source or by generating requests on a regular basis or by the data completed by a user, The set of entities $ENS_1$ is called the entities associated with the first entity $ENT_1$ because they are in the same category $CAT_1$ and in the zone $Z_1$.

The invention makes it possible to generate a plurality of indicators $I_1$, $I_2$, $I_3$, $I_4$, $I_5$, $I_6$ that each form a metric to generate a composite visibility indicator $IND_C$. One advantage of the invention is to standardize the quantification scale of each visibility indicator to obtain a scale of a composite visibility indicator $IND_C$ that is readable and comparable with other indicators of the same nature. One advantage of using a standardized quantification is that it allows for a quick evaluation of the quality of visibility of an entity $ENT_1$ within a zone. According to one example, a visibility indicator $I_p$ is an index between 1 and 6. The latter index can be represented according to a letter {A, B, C, D, E, F}. In other cases, the indicators are quantified on other scales, for example a scale of 1 to 5, or a scale of 1 to 10, or a scale of 1 to 20.

According to one exemplary embodiment, each quantification of the scale of values includes a sub-quantification comprising a scale of standardized values. For example, A includes $a_1$, $a_2$, $a_3$, B includes $b_2$, $b_3$ and so on. Other examples of sub-quantification of the main value scale can be implemented.

Georeferencing Check

According to one embodiment, an initial sub-request $R_0$ is used to obtain a presence or not of the first entity $ENT_1$ within a digital mapping in which said first entity $ENT_1$ is georeferenced. This check allows an indication of georeferencing of the first entity $ENT_1$ to be delivered.

Georeferencing may result from an action for activating a referencing of a position with an authority administering a digital mapping. In other words, georeferencing is possibly activated by creating a user account with a rights management server and activating a referencing in which a position or address associated with the first $ENT_1$ entity is defined. Georeferencing results in generating a graphic marker, such as a symbol, on the digital mapping associated with the first entity $ENT_1$ at the previously defined position.

In this checking step, the initial sub-request $R_0$ aims at identifying whether this activation has been performed. In a first case, the first entity $ENT_1$ has been georeferenced, in another case it has not. Depending on the case, this georeferencing check data constitutes a preliminary indicator.

First Indicator $I_1$

According to one embodiment, a first sub-request $R_1I$ which can also be grouped in the same initial sub-request $R_{11}$ aims at retrieving a data relating to texts corresponding to users' reviews on the first entity $ENT_1$. The first indicator $I_1$ can be considered as an indicator of awareness. The reviews are published on a Web page accessible by a URL and whose data can be extracted from a database. The retrieved piece of data includes, for example, a grade, a number of reviews, possibly the distribution of the grades according to a scale. According to one embodiment, data collected from this first sub-survey $R_{11}$ are processed in order to generate a first indicator $I_1$. The first indicator $I_1$ aims at quantifying a set of texts associated with grades. These texts correspond to user reviews and the grades correspond to an indication given by a user to qualify the quality of service of the first entity $ENT_1$ within the first zone $Z_1$.

The first indicator I1 can take account, for example, of the number of reviews, the disparity of reviews, the global grade of reviews, the number of grades below a threshold $S_{MIN}$, the number of grades above a threshold $S_{MAX}$, the number of grades between two threshold values $S_{MIN}$, $S_{MAX}$.

Second Indicator $I_2$

According to one embodiment, a second sub-request $R_{12}$ which can also be grouped in another sub-request $R_0$, $R_{11}$, aims at retrieving a data relating to the presence of a digital resource locator such as a URL of a Web page $PW_1$ comprising data relating to the first entity $ENT_1$ and to the first zone $Z_1$. This page is denoted as the local Web page of the first entity $ENT_1$, it is denoted as $PW_1$. In the case of a chain of restaurants, for example called "la bonne assiette", the method of the invention aims at checking that if a restaurant is present in a place, for example Clermont-Ferrand, then the URL www,labonneassiette.com\Clermont-Ferrand.html refers to an existing page comprising data relating to the restaurant which is located in the region of Clermont-Ferrand. This page can also indicate menus, opening hours, and practical information. The page can also include a component for online reservations or a component collecting customer reviews.

In this example case, the retrieved piece of data includes a URL of the page $PW_1$ or at least one indication of the existence of the URL. The indicator is considered as a local visibility indicator. It corresponds, for example, to the presence of a local Web page $PW_1$ associated with the first entity ENT; and to the location, for example, of the zone $Z_1$ or of a zone close to $Z_1$ or a zone encompassing the zone $Z_1$ or of a position of the zone Zi Enrichment of the Second Indicator $I_2$ (Criteria of Performance and Accessibility of the Local Web Page)

According to one embodiment, the second sub-request $R_{12}$ also aims at retrieving a piece of data relating to a display performance indicator of a digital resource, for example, such as a local page $PW_1$ hosted on a server of the data network $NET_1$. Furthermore, data relating to an accessibility indicator of the digital resource can be obtained. These performance and accessibility indicators are measured insofar as checking the existence of a local web page $PW_1$ has been previously performed.

According to one embodiment, data retrieved from the local Web page $PW_1$ are enriched in order to quantify and qualify the data of the page $PW_1$. For example, among the data retrieved, there are: the length of character strings and paragraphs of the page $PW_1$, the number of internal and external digital resource locators URN, such as internal links contained in the page $PW_1$ and the number of external links contained in the page $PW_1$, the presence of an interactive component for reserving or ordering a product or a service, the presence of an interactive component allowing users to publish a review or to transmit a m essage.

Internal links correspond, for example, to URLs referring to pages other than the local page $PW_1$ within the same Internet or intranet site. External links correspond to UR Ls referring to other sites with a root URL different from the root URL of the local web page $PW_1$.

The presence of an interactive component can be detected from the number and/or type of activation buttons detected in a page. Alternatively or in combination, this presence can be detected by the detection of a specific field, such as a "contact" field, a "download" field, or a "submit" field, etc. According to another possibility, the nature of the component can be done by analyzing the executed script and/or its language. For example, a JavaScript component indicates the presence of processing executed locally on the Web page from a user data.

According to one embodiment, the second indicator $I_2$ comprises a data quantifying the loading time of a digital resource, such as a web page or an application resource. Furthermore, according to one embodiment that may be combined with the previous ones, the second indicator $I_2$ comprises a piece of data quantifying a refresh time of a digital resource, for example a web page. According to one embodiment that may be combined with the previous ones, the second indicator $I_2$ comprises a piece of data quantifying a criterion for encoding the digital resource or a criterion of weight of the same. This may be the number of bytes encoding the data of a web page. Furthermore, a data relating to the compatibility with a given terminal can be collected to generate the second indicator $I_2$.

According to one embodiment, a set of data quantifying the accessibility of the digital resource may be collected to enrich the second indicator $I_2$. According to one example, the criteria of performance and accessibility can be dissociated in two distinct indicators $I_{21}$ and $I_{22}$. According to one example, a font size adaptability data can be taken into account for a given terminal and/or user profile. According to another example, a criterion for adapting the display of a digital resource to a given browser is taken into account in determining the second indicator $I_2$.

According to one example, the second indicator $I_2$ is calculated from a value qualifying the natural referencing of the local page PWi in a search engine and more generally within a plurality of search engines. This indicator can be correlated with a non-natural referencing indicator, see $I_4$, or be integrated into the request $R_{14}$ detailed below.

The second indicator $I_2$ aims in particular at quantifying the performance of a local page, in particular by quantitatively and qualitatively evaluating data contained in this local page $PW_1$ and possibly the accessibility of this local page.

Third Indicator $I_3$

According to one embodiment, a third sub-request $R_{13}$ which can also be grouped in another sub-request $R_{11}$, $R_{12}$ aims at retrieving a data relating to a first referencing indicator $IND_{REF1}$ from at least one search engine.

According to one example, the first referencing indicator $IND_{REF1}$ is obtained from an algorithm for analyzing the links contributing to the web page ranking system used by a search engine. According to other embodiments, the notion of a web page can be generalized to any digital resource such as the one stored in a database of an application.

The search engine is, for example, accessible from a digital resource locator such as a URL, denoted as $URN_{MOT}$. According to one embodiment, the first referencing indicator $IND_{REF1}$ is generated from a data representing the number of links pointing to a given URL associated with the first entity $ENT_1$, denoted as $URL_{ENT1}$, $URL_{ENT1}=\{PW_1,$ a root page of $PW_1\}$. The first referencing indicator $IND_{REF1}$ can take account of the number of links pointing to the page $PW_1$ when the latter exists.

The collected piece of data is generally used to assign a rank of appearance of a URL associated with an entity following the edition of a request $REQ_{MOT}$ containing keywords $TAG_1$ within a search engine. In the latter case, when the request $REQ_{MOT}$ includes keywords associated with the first entity $ENT_1$, the search engine that is addressed returns a results page PWR sorted in the form of a list sequenced by order of relevance. As an example, the rank of appearance of a $URL_{ENT1}$ associated with the first entity $ENT_1$ in the list is used to evaluate the accessibility indicator $IND_{ACC}$. The URL is preferably the URL of the local page URLLOC of the first entity $ENT_1$ associated with the first zone Zl. According to other examples, the URL corresponds to a URL of the home page $PW_A$ of a site associated with the first entity $ENT_1$, such as a site comprising the root of the URL of the local page $WEL_{LOC1}$. According to one example, the keywords $TAG_1$ comprise data included in URL. According to another example, the keywords comprise the name of the first entity $ENT_1$ and the name of the geographical zone $Z_1$.

According to one embodiment, the first referencing indicator $IND_{REF1}$ is a score for evaluating the referencing of a URL within a set of WEB pages of a data network NETS such as the Internet.

According to one example, the third indicator $I_3$ is generated on a predefined scale as a function of the score of the first referencing indicator $IND_{REF1}$, According to another case, the third indicator $I_3$ is the first referencing indicator $IND_{REF1}$.

According to one embodiment, the third indicator $I_3$ is an indicator standardized to a same scale as the other indicators. According to another embodiment, the third indicator $I_3$ is calculated as a function of scores relating to other indicators calculated for other entities $ENT_1$. The relative score aims at comparing the score of the first referencing indicator $IND_{REF1}$ of the first entity $ENT_1$ against the scores of the first referencing indicator $IND_{REF1}$ of each entity of a list of entities $ENT_1$. The list of entities $ENT_1$ considered is preferably chosen in a same category as the first entity $ENT_1$ and the entities $ENT_1$ of the list are located in the same zone $Z_1$. According to one example, this list is identified by the user, according to another example this list of entities $ENT_i$ is automatically generated from data extracted from a database. Thus, the third indicator $I_3$ is generated by comparing different ranks of appearance from at least one search engine of different entities of a same category in the same zone.

According to one example, the third indicator $I_3$ is calculated as a function of the score of a plurality of referencing indicators $IND_{ACC}$ themselves calculated from a plurality of search engines.

Fourth Indicator $I_4$

According to one embodiment, a fourth sub-request $R_{14}$, which can also be grouped in a previous sub-request, aims at retrieving a data relating to a second referencing indicator $IND_{REF2}$ of a URL associated with the first entity $ENT_1$ within a web page produced in response to a request including the name of the entity $ENT_1$. Said request preferably comprises the definition of a position $POS_1$ or a zone $Z_1$. Thus, according to one exemplary embodiment, the second referencing indicator $IND_{REF2}$ comprises a piece of data specific to the nature of the Web page produced within the results page $PW_R$. Indeed, the Web page can be a local web page $PW_1$ or a general page of a site associated with the first entity $ENT_1$, for example a root page of the page $PW_1$.

The value of the second referencing indicator $IND_{REF2}$ of the URL can vary as a function of:
  the nature of the URL depending on whether it corresponds to a home page PWA of a site or a particular page such as a local page in proximity to or in the zone $Z_1$, for example the city of "Clermont-Ferrand", and/or;
  the activation of a campaign with a search engine and the parameters of said campaign, and/or;
  the keywords necessary to display the URL and/or;
  the display position within the generated list of results;
  the presence of other UR Ls and the nature of other entities such as "Wonderful dishes" and "delicious courses" in the same category, namely "Gourmet Restaurants", The second referencing indicator $IND_{REF2}$ can include a data indicating whether the referencing of the URL is natural or whether it is the result of a campaign or both.

The second referencing indicator $IND_{REF2}$ can take account of the position of the URL in the list of returned results or the reading of a referencing indicator specifying whether a campaign has been activated with the search engine. The campaign defining for example a duration, a number of displays or clicks on the URL and a text accompanying the URL displayed.

According to one example, a request aims at checking the presence of a URL referring to a site of a restaurant or a chain of restaurants called "la bonne assiette", the URL of the banner being www.labonne-assiette.com, this WEB address including for example a local page www.labonne-assiette.comiclermont-ferrand for the restaurant located in the zone defined by the city of Clermont-Ferrand.

Let us consider the example in which this restaurant is referenced in the category "Gourmet Restaurants" in a database. This restaurant is widespread over the territory in several places with other restaurants of the same category, such as "Wonderful dishes", "tasty food" and "dishes from the past".

It is considered the case where a URL associated with "the right address" is returned in the first positions of the list of results when the keywords of a request are:
  "restaurant+Clermont-Ferrand", or;
  "tasting+Clermont-Ferrand" or;
  "cooking+Clermont-Ferrand"

In this example case, the method of the invention identifies the presence of a URL and the keywords that are used and generates a second referencing indicator $IND_{REF2}$.

Fifth Indicator $I_5$

According to one embodiment, a fifth sub-request $R_{15}$, which can also be grouped in a previous sub-request, aims at retrieving a piece of data relating to a third referencing indicator $IND_{REF3}$ of a URL associated with the first entity $ENT_1$ within a set of web pages made accessible from a search engine on a browser of a given terminal. One advantage is that it takes account of the type of terminal. Thus, this indicator makes it possible to account for the diffusion of the visibility of the first entity $ENT_1$ according to the type of terminal addressed. The terminal can be a mobile terminal such as a smartphone for example. The presence of the URL is evaluated with a web page produced in response to a request including the name of the entity $ENT_1$ and, for example, the definition of a position $POS_1$ or a zone $Z_1$. Thus, according to one exemplary embodiment, the third referencing indicator $IND_{REF3}$ comprises a data specific to the page pointed to by the URL produced within the results page $PW_R$. Indeed, the web page may be a local web page PkAti or a root page of the page $PW_1$.

Sixth Indicator $I_5$

According to one embodiment, a sixth sub-request $R_{16}$, which may also be grouped in a previous sub-request, aims at retrieving a piece of data specific to the position of a set of georeferenced mobile terminals when they are near the position of the first entity $ENT_1$. In the latter case, the piece of data can be measured periodically, for example, over a predefined duration. The measurement of a number of terminals located at the position or at a position close to the first entity $ENT_1$ according to a predefined perimeter makes it possible to obtain a piece of data specific to the traffic generated within the first entity $ENT_1$. The piece of data is obtained from a population of users who have previously activated the georeferencing of their terminal and authorized usage of this piece of data by an application installed on the terminal.

One interest is to generate a traffic indicator from the collected data relating to the presence of terminals at a position corresponding to that of the first entity $ENT_1$ and the quantification of this presence.

The operation of retrieving terminal georeferencing data can be reiterated for a set of entities $\{ENT_i\}_{i \in [1;N]}$ of the same category $CAT_1$ and in the same zone $Z_1$. Thus, a relative traffic indicator can be derived from the set of collected georeferencing data. One interest is to produce a standardized indicator from the observed traffic deviations of a population within a plurality of entities $ENT_i$ and the first entity $ENT_1$. The course of the traffic indicator can then be established over a predefined period of time. One interest is to observe relative courses between different entities $ENT_1$. These courses make it possible, in particular, to validate or correct a strategy aimed at carrying out a set of operations to increase the grade assigned to the sixth indicator $I_6$.

The method of the invention includes a step aimed at collecting data from different digital resources in order to generate the different indicator values: $I_1$, $I_2$, $I_3$, $I_4$, $I_5$, $I_6$.

TABLE 1

| Scale of values | Type of Indicator | Parameters taken into account |
|---|---|---|
| $I_0$ Yes/No | Georeferencing indicator (preliminary indicator) | Georeferencing check: Measures the association of a digital entity with a defined position within a digital mapping generated from a data source. |
| $I_1$ 1 à 6: {A, B, C, D, E, F} | First Indicator: awareness indicator | Measures the awareness of a digital entity based on already existing reviews for example gathered within a web page generated from a data source such as a database. Parameters can include the number of reviews, the final grade, the distribution of reviews and grades within a value range. |
| $I_2$ 1 à 6: {A, B, C, D, E, F} | Second Indicator: local visibility indicator | Measures local visibility: the presence of a digital resource such as a web page accessible through a URL describing data associated with an entity and a zone $Z_1$ in which the digital entity is located. The indicator can take account of a criterion of performance of the digital resource (e.g., measurement of the number of characters, number of outbound links, number and type of interactive components, loading time, weight of the page, etc.) and/or a criterion of accessibility (font size, adaptability to the browser, etc.) |
| $I_3$ 1 à 6: {A, B, C, D, E, F} | Third indicator: first referencing indicator | Measures the accessibility of a specific URL: Number of pointing internal links; number of pointing external links; |
| $I_4$ 1 à 6: {A, B, C, D, E, F} | Fourth Indicator Second referencing indicator | Measures natural or non-natural referencing by possibly taking account of keywords, the character string defining the URL or its description, campaign duration; maximum number of digital impressions, maximum number of clicks, etc. |
| $I_5$ 1 à 6: {A, B, C, D, E, F} | Fifth indicator: third referencing indicator | Measures the natural or non-natural referencing on a given terminal type. |
| $I_6$ 1 à 6: {A, B, C, D, E, F} | Sixth indicator: traffic indicator | Measures the traffic at an entity's position (and its course) from a measurement of the position of georeferenced terminals. The measurement is performed relative to other entities in order to standardize the indicator. |

A step K_COMP is shown in FIG. 1 in which comparisons or correlations are performed between data collected from the requests and threshold values to generate scores. According to one embodiment, threshold values are stored in a memory of a server $SERV_1$. They are, for example, updated regularly as a function of a learning based on the measurement of results in other categories $C_i$ in the same zone Z or in the same category $C_1$ in other zones $Z_1$. One advantage of the method of the invention is to adjust the threshold values according to a large number of variables to obtain a standardization of the scores that is most representative of the visibility of an entity on a data network $NET_1$. This last step is denoted as K_SCORE in FIG. 1.

According to one example, the threshold values are re-evaluated or weighted when used based on an overall evaluation of the visibility of entities in the same zone.

According to one exemplary embodiment, the method of the invention makes it possible to generate a composite visibility indicator $IND_C$ from the previously defined indicators. This step is represented in FIG. 1 by the step $GEN\_IND_C$.

According to one example, a formula of the type:

$$IND_C = (a \cdot I_1 + b \cdot I_2 + c \cdot I_3 + d \cdot I_4 + e \cdot I_5 + f \cdot I_6)/6$$

The coefficients a, b, c, d, e, f, g are, in this example, weighting coefficients, Other formulas can be implemented according to different embodiments. The composite visibility indicator $IND_C$ can also result from a non-linear function of indicators $I_1$, $I_2$, $I_3$, $I_4$, $I_5$, $I_6$. According to another example, some indicators $I_1$, $I_2$, $I_3$, $I_4$, $I_5$, $I_6$ are related to each other by a functional relationship. According to one example, the weighting coefficients are equal to 1, the indicators can have values from 1 to 6.

If $I_1 = 6$, $I_2 = 4$, $I_3 = 4$, $I_4 = 6$, $I_5 = 2$, $I_6 = 2$, it is obtained: $IND_C = 4$.

FIG. 1 represents a step denoted as K SCORE which includes the calculations of each indicator $I_1$, $I_2$, $I_3$, $I_4$, $I_5$, $I_6$ as a function of the data collected.

According to one embodiment, the invention allows the request and score calculation steps to be performed for each entity identified in the same category and present in the zone Thus, it is possible to generate a composite visibility indicator for each entity $\{ENT_i\}_{i\in[1;N]}$.

In the preceding example, the method of the invention makes it possible to calculate the different indicators $IND_{C1}$, $IND_{C2}$, $IND_{C3}$ respectively associated with the entities $ENT_1$, $ENT_2$, $ENT_3$. The standardization of calculation of the scores makes it possible to compare the visibility of an entity $ENT_1$ with respect to another entity $ENT_1$. According to one example, in the previous case $IND_{C1} < IND_{C2} < IND_{C3}$ is found.

The method of the invention further comprises a step for generating a first mapping. This step is denoted as GEN_CARTO in FIG. 1. The first generated mapping includes a representation of a region adapted to represent the zone or part of the zone $Z_1$. The method makes it possible to generate symbols corresponding to each entity $ENT_1$, denoted as $REF_i$ in FIGS. 3 and 4.

Furthermore, the method makes it possible to generate a list of strategies $\{STRAT_k\}_{k\in[1;N]}$ comprising a set of actions aiming at correcting the composite visibility indicator INDc, of the first entity $ENT_1$ as a function of a set of parameters. The strategies $STRAT_k$ may especially be generated according to a sequenced list according to a goal to be achieved. According to one example, the method of the invention integrates an artificial intelligence algorithm MOT_AI to generate and sequence the strategies. In the latter case, the artificial intelligence algorithm is based, for example, on a neural network trained from a plurality of scenarios. The scenarios are defined for given zones, given categories, density configurations of entities $ENT_1$, population densities, population age distributions, etc.

According to another embodiment, the method of the invention generates a second mapping. The second mapping corresponds to the display of a region encompassing a plurality of positions of a same entity $ENT_1$. A set of entities having the same designation and being georeferenced at a given position is called an entity group. It is for example a banner, a brand or a franchise which includes a plurality of stores or restaurants or car repair shops, etc.

The region displayed to generate this second mapping is then generally larger than a previously defined zone, such as the first zone $Z_1$. The dimensions of the second mapping can be predefined. They can correspond to the dimensions of a country, a region or state, a department or county or any other territorial division specific to a state administration. According to another example, the dimensions of the region are generated automatically as a function of the positions of the different entities, such as the entities $ENT_1$. This latter case is advantageous when a territorial implementation of a banner is limited in space locally or regionally. It may be interesting, by way of example, to generate a second mapping at the Alps level, that is, a region straddling several countries and regions.

In this second mapping, the symbols of each first entity are displayed and include the score of the composite visibility indicator $IND_{C1}$. One interest is to establish metrics of a same banner on a region in order to identify, for example, communication modes specific to different regions or even to analyze marketing communication strategies of a same banner on a large territory.

FIG. 1 represents a step denoted as APPL1_STRAT which results from the selection of a strategy by a user. The selection of the strategy is performed from an interface for selecting a given strategy. This last selected strategy aims at defining a new parameterization of the values inducing calculation of the indicators $I_1, I_2, I_3, I_4, I_5, I_6$.

According to one embodiment, the application of a strategy leads to a recalculation at regular time intervals of the composite visibility indicator $IND_{C1}$ of the first entity $ENT_1$ and possibly of the other entities $ENT_1$ in order to compare the different indicators generated to each other. The duration of the interval of a new calculation of a composite visibility indicator $IND_{C1}$, $IND_{C1i}$ is parameterizable. The intervals are defined, for example, between a few days or a few weeks and a few months.

FIG. 2 represents a data network $NET_1$ such as the Internet network. A user $U_1$ has a terminal $T_1$ which can be a computer, a PC-like personal computer, a smartphone, or a digital tablet. The terminal includes an interface for accessing functions for implementing the method of the invention. The terminal $T_1$ includes a communication interface for establishing data links with network equipment connected to the data network $NET_1$. The invention applies to a plurality of users Ui each having a terminal $T_1$ and being able to successively or simultaneously execute a computer program implementing the steps of the method.

FIG. 1 represents a first server $SERV_1$ which is a server configured to execute main steps of the method. In this case, the server SERVI generates the requests from a main request generated from a terminal $T_1$ of a user $U_1$. The server SERVI is configured to retrieve the data and generate visibility indicators flklkem: Ni and the composite visibility indicator INIDc for each entity $ENT_1$, $ENT_i$ identified, From the calculation of the visibility indicators, the server $SERV_1$ returns edited information to the terminal $T_1$ describing, for example:

interactive mappings representing symbols assigned to the entities $ENT_1$ of the processed zone $Z_1$;
strategies and recommendations prompting a user to perform a set of actions,
lists, diagrams and curves representing the values of the different indicators associated with each entity $ENT_1$.

According to one embodiment, the server $SERV_1$ is associated with at least one database. A first database $BD_1$ includes, for example, user profile data. Furthermore, a second database $BD_2$ includes data of categories, zones, densities of entities $ENT_i$ and variations of indicator scores as a function of applied strategies. According to one embodiment, the database $BD_2$ comprises data collected from a neural network and corresponding to different scenarios of score calculations as a function of a set of input data.

The scores calculated to generate visibility indicators can be used in particular for learning of a neural network. Furthermore, these data can be used for statistical purposes.

According to one embodiment, a second server $SERV_2$ is represented in FIG. 1. The server $SERV_2$ is, for example, a server hosting a search engine that is associated with a database $BD_3$. The database $BD_3$ includes data describing the content of web pages for their referencing by at least one search engine.

According to one embodiment, a third server $SERV_3$ is represented in FIG. 1. The server $SERV_3$ is, for example, a server hosting web pages, in particular web pages of at least one entity $ENT_i$.

FIG. 3 represents an example of the generation of a digital mapping obtained from the method of the invention. In this example, the city of Laputa and its surroundings are represented, any other example of a map of whatever city is compatible with the invention. The invention is not limited to urban zones, but can also be applied to any other type of region. According to the example of FIG. 3, the category $CAT_2$ defines a category concerned with car repair shops. This category $CAT_2$ defines a parameter that is used to size the zone $Z_1$. In the case of a car repair shop activity, a zone of a few tens of kilometers can be automatically defined around a chosen position. The chosen position is here the center of the city of Laputa. The center can be automatically defined by retrieving an administrative piece of data, for example, from an authority of the data network $NET_1$ or by a piece of data from a database for generating interactive digital maps. In the example of FIG. 3, the dimensions of the zone are 20 km×26 km.

The example case is considered in which the entities are:
$ENT_1$="the associated car repair shops", referenced on map 10: $REF_1$
$ENT_2$="Free wheel", reference $REF_2$;
$ENT_3$="Let's go", reference $REF_3$;
$ENT_4$="Fine Auto repair", reference $REF_4$.
And the zone is defined by:
$Z_1$=Laputa and its surroundings.

Mapping 10 of FIG. 3 represents symbols 4, 5 in the form of inverted water drops associated with each entity $ENT_i$. Symbol 4 is assigned to entity $ENT_1$. The other symbols 5 are associated with the other references $REF_i$, which generally correspond to entity references of the same category as the first entity $ENT_1$.

The symbol also represents an indication of a grade corresponding to the calculated score of the composite visibility indicator $IND_C$. In the example case in FIG. 3, the grades assigned to each entity $ENT_1$ are:
Score ($IND_{C1}$)=D;
Score ($IND_{C2}$)=C
Score ($IND_{C3}$)=F
Score ($IND_{C4}$)=E In the example case of FIG. 3, a selection of the symbol 5 of the reference $REF_2$ associated with the entity $ENT_2$ is performed. The method of the invention then makes it possible to display an interactive window 6 presenting a list of grades associated with the different visibility indicators $\{I_k\}_{k \in [1; N]}$. In this example, it is possible for the user to access a piece of information associated with each visibility indicator 1k and to appreciate the good or bad scores in a single operation.

In this example case, the score of the composite visibility indicator $IND_{C1}$ of the entity $ENT_1$ is lower than that of the entity $ENT_2$ and higher than that of the entities $ENT_3$, $ENT_4$. A strategy can be provided in which the awareness of the first entity $ENT_1$ is privileged over its visibility. The increase of the indicators $I_1$, $I_2$ is then privileged in order to increase awareness of the first entity $ENT_1$.

According to one embodiment, the strategy generated and provided takes account of the best score of the other entities $ENT_i$, here it is the score of the entity $ENT_2$ which is the letter C. Consequently, the adopted strategy is established as a function of data specific to other scores obtained from the method of the invention of the other entities of the same category in the same zone FIG. 4 represents an example of the generation of a digital mapping 11 obtained from the method of the invention. In this example, the zone 11 of downtown Laputa is represented. The category $CAT_1$ is that previously discussed of fine-food restaurants also called "gourmet restaurants". According to the example of FIG. 4 and taking the aforementioned example case, in this example there are:
$ENT_1$=La Bonne Assiette, referenced on map 10: REF1'
$ENT_2$=The wonderful preparations, reference REF2',
$ENT_3$=the succulent dishes, reference REF3'.
$ENT_4$=the dishes from the past, reference REF4'.
$CAT_1$=Gourmet Restaurants
$Z_1$=Laputa.

Mapping 11 in FIG. 4 represents symbols similar to those in mapping 10 in FIG. 3. In the example case in FIG. 4, the grades assigned to each entity $ENT_i$ are:
Score ($IND_{C1}$)=D;
Score ($IND_{C2}$)=C;
Score ($IND_{C3}$)=C;
Score ($IND_{C4}$)=B;

In this example case, the score of the composite visibility indicator $IND_{C1}$ of the entity $ENT_1$ is lower than the other scores of the entities in the same category. A strategy can be provided in which the visibility of the first entity will be privileged with respect to the awareness. The increase of the indicators $I_1$, $I_3$, $I_5$ will be privileged in order to increase visibility of the first entity $ENT_1$.

According to other examples, other strategies can be conducted. For example, when the indicator $I_2$ is below a given threshold, the strategy provided is to increase the score of $I_2$ before taking actions to increase the other scores.

FIG. 5 represents an example of a generated strategy list with 4 strategies, denoted as: $STRAT_1$, $STRAT_2$, $STRAT_3$, $STRAT_4$. The strategies generated are displayed in a window 15 on a user interface of terminal $T_1$. The strategies can be activated by an activatable element such as a button 13, Activating a strategy automatically generates a list of actions. The actions are, for example, pre-parameterized and a user is prompted to implement these actions. The actions can be weighted in volume and time by a weighting coefficient. The weighting coefficient can result, for example, from the definition of a budget.

FIG. 6 represents a dashboard displayed in a window 16 indicating the list of visibility indicators $\{I_k\}_{k \in [1; N]}$ and the value of their score. The indicators are represented in activatable zones 14 which may be buttons. In this example, an action on the zone 14 provides access to data describing the indicators, such as a predefined parameterization or the definition of criteria used to perform the calculation.

The scores are represented here in display zones 12. The latter zones can be made activatable in order to access a detail of the grade and of its perspective of other metrics. As an example, the method of the invention makes it possible to compare scores of visibility indicators $I_k$ of a plurality of entities $ENT_1$.

FIG. 7 represents a curve obtained from the course of a score of a composite indicator $IND_{C1}$ of the first entity $ENT_1$ over time after applying two different strategies $STRAT_0$ and $STRAT_1$. In this case, the score values are transposed on letters of the alphabet where A is the best value and F the worst value. This transposition is an example of standardization of the score values of the composite visibility indicator $IND_{C1}$.

In this example, at to, the composite visibility indicator $IND_{C1}$ is equal to F at point $M_0$ of the curve, that is, the worst possible grade. A first strategy $STRAT_0$ is applied prompting the user to take some actions. These actions can be, for example:
Activating a georeferencing on a given digital mapping;
Activating a URL of a local page $PW_1$ of the entity $ENT_1$ associated with a first zone $Z_1$;
Creating at least one outbound link on the local page $PW_1$;
Creating at least one link pointing to the local page $PW_1$;
Activating an interactive component on the local page $PW_1$;
Activating a non-natural referencing;
Activating a non-natural referencing on a given type of terminal;
Modifying the keywords of a non-natural referencing;
Increasing the budget of a non-natural referencing;
Etc.

In the example in FIG. 7, the application of a strategy $STRAT_0$ makes it possible to result in position $M_1$. The strategy $STRAT_0$ makes it possible to result in the generation of a composite visibility indicator $IND_{C1}$ with a value equal to D, thus higher than F. However, this value stagnates between $t_i$ and $t_2$. This stagnation may be due to the cessation of actions undertaken because of the application of the strategy $STRAT_0$ or it may be due to a threshold effect even if the strategy $STRAT_0$ continues to be applied. The method includes a step to continuously measure the value of the composite visibility indicator $IND_{C1}$ in order to detect its courses over time, in particular decreases below a first threshold, increases beyond a second given threshold or stagnations. According to the course of the value of a composite visibility indicator $IND_{C1}$, the method includes a step to generate a recommendation of a new strategy for increasing the value of the composite visibility indicator $IND_{C1}$. This increase can either be noticed until the end of the application of a strategy, or feedback controlled to reach a target value, According to a preferred mode, the strategy is applied and then steps of measuring the value of the composite visibility indicator $IND_{C1}$ where the latter is measured within a given time interval without a target value being defined.

In the example of FIG. 7, the target value is a value that is defined relative to a score of a composite visibility indicator $IND_{C2}$ of a second entity $ENT_2$. In the case of FIG. 7, the target value is equal to B. According to an alternative, the strategy is not applied so that the course of the indicator is not feedback controlled to a target value to be reached.

According to other examples, the target value can be defined independently of other scores, in another embodiment, it can be defined from an average value of a plurality of scores of different entities $ENT_i$. According to another example, the target value is defined according to conditions such as a duration, a budget, or by limiting actions according to some visibility indicators $\{I_p\}_{p\varepsilon[1;N]}$.

In the example of FIG. 7, a new strategy $STRAT_1$ is applied at point $M_2$ after a period of score stagnation. The strategy $STRAT_1$ aims at generating a new list of actions to be performed. The duration of the actions, their repetition, their order or even a quantification of some actions can be configured.

The value of the composite visibility indicator $IND_{C1}$ can be measured again regularly. According to this example, at an instant $t_3$, a score of the indicator $IND_{C1}$ is measured, the value of the score is here greater than or equal to B. In this case, the target value is reached at point $M_{target}$ and a strategy can then be adapted to maintain the value.

One advantage is to define a strategy adapted to a given environment, that is, a given category $CAT_1$ of entities $ENT_1$ and a given geographical zone $Z_1$ while allowing the strategy to change over time based on measurements performed over a given time period.

The invention claimed is:

1. A method for generating a composite visibility indicator of at least one first entity within a data network comprising connected equipment and storing digital resources designating entities, each entity being accessible from a digital resource locator within the data network, the method comprising:
   selecting a first category of entities from a user interface, each category being defined in at least one database of a server of the data network;
   selecting a first position from a user interface;
   associating said first position with a first geographical zone, said first geographical zone defining a zone around the first position as a function of the selected category;
   checking a georeferencing on a digital mapping accessible from a data network of a digital resource locator, said digital resource locator pointing to a resource associated with the first entity;
   automatically generating at least one request from a calculator to collect data from at least one remote database and calculating from said data collected and from a calculator:
      a first indicator quantifying a set of texts associated with grades of a set of users, said set of texts being digitally associated within a database with the first entity in the first zone, said quantification being performed on a predefined scale, said set of texts associated with grades being generated on at least one data page of the first data network of the digital resource locator;
      a second indicator of the existence of at least one resource comprising a first web page referencing data associated with the first entity and with at least one position of the first zone or with the first zone;
   generating a composite visibility indicator for each entity of the first category selected within the first zone, said visibility indicator being a function of the first indicator and of the second indicator.

2. The method for generating a composite visibility indicator according to claim 1, wherein the first indicator further comprises a measurement of a number of texts, each text being associated with an author and with an entity of the first category selected within the first zone.

3. The method for generating a composite visibility indicator according to claim 1, wherein the second indicator further comprises at least one of a criterion of technical performance of the first web page and/or a criterion of accessibility of the first web page.

4. The method for generating a composite visibility indicator according to claim 3, wherein the criterion of technical performance of the first web page comprises at least one of a first criterion of loading time of the web page, a second criterion of refresh time of the web page, a third criterion of weight in bytes of the web page, and a fourth criterion of compatibility with a terminal.

5. The method for generating a composite visibility indicator according to claim 3, wherein the criterion of accessibility of the first web page comprises a first criterion of adaptability of the font size of a content of the web page.

6. The method for generating a composite visibility indicator according to claim 1, further comprising collecting:
   a third indicator of a position of a digital resource locator within a ranking of resource locators, said resource locator comprising at least one link pointing to a web page associated with the first entity;
   said composite visibility indicator being a function of the third indicator.

7. The method for generating a composite visibility indicator according to claim 1, further comprising collecting:
   a fourth indicator of a presence of a digital resource locator pointing to a web page associated with the first entity, said digital resource locator being generated at a predefined position within a results page produced by a search engine whose search criteria comprise a piece of information related to the first zone and a piece of information related to the first entity, said composite visibility indicator being a function of the fourth indicator.

8. The method for generating a composite visibility indicator according to claim 7, wherein the generation of the digital resource locator is activated as a function of at least one criterion of the user profile.

9. The method for generating a composite visibility indicator according to claim 1, further comprising collecting:
a fifth indicator of a presence of a digital resource locator pointing to a digital resource associated with the first entity, said digital resource locator being generated at a predefined position within a web page produced by a search engine whose search criteria comprise a piece of information related to the first zone and a piece of information related to the first entity, said digital resource locator being generated on a display of a mobile terminal, said composite visibility indicator being a function of the fifth indicator.

10. The method for generating a composite visibility indicator according to claim 1, further comprising collecting:
a sixth indicator of a value quantifying a traffic at a position corresponding to that of the first entity, said traffic being measured from the determination of the position of a set of terminals whose geolocation function is activated, the sixth indicator being calculated from a standardized value of the value quantifying the traffic,
said composite visibility indicator being a function of the sixth indicator.

11. The method for generating a composite visibility indicator according to claim 10, wherein the standardized value of the value quantifying the traffic is established from a plurality of traffic measurements of entities of a same first category in the same first zone.

12. The method for generating a composite visibility indicator according to claim 1, wherein the method is reiterated for a plurality of entities of a same category, in a predefined geographical zone, a set of composite visibility indicators being generated.

13. The method for generating a composite visibility indicator according to claim 12, further comprising generating a first mapping whose distance resolution is defined according to the size of the first zone and whose centering is a function of the given position, the method comprising, for each entity present in the first zone, generating a graphic symbol at a given position, said given position being extracted from the georeferencing of the digital resource locator associated with said entity, each graphic symbol comprising a digital piece of data corresponding to a score associated with the composite visibility indicator.

14. The method for generating a composite visibility indicator according to claim 12, further comprising generating a second mapping whose distance resolution is defined such that a region comprising a plurality of predefined positions, corresponding to a set of respective first entities georeferenced, the set of respective first entities georeferenced representing a group, a centering of the represented region being a function of the set plurality of predefined positions, the method comprising, for each first entity of the group present in the region, generating a graphic symbol at each given position, each graphic symbol comprising a digital piece of data corresponding to a score associated with the composite visibility indicator.

15. The method for generating a composite visibility indicator according to claim 12, further comprising generating a list of composite visibility indicators, comparing at least one first composite visibility indicator with the other composite visibility indicators being performed to determine a given strategy, a strategy comprising at least one list of actions organized to generate an increase in a value of a score of the at least one first composite visibility indicator.

16. The method for generating a composite visibility indicator according to claim 15, wherein the actions comprise at least one of:
activating a georeferencing on a given digital mapping;
activating an accessibility of a digital resource locator of a given web page or of a given resource associated with the first entity, said web page or resource being associated with a first zone within a data network;
creating at least one outbound link on the local page $PW_1$;
creating at least one link pointing to the local page $PW_1$;
activating an interactive component on the local page $PW_1$; activating a non-natural referencing;
activating a non-natural referencing on a given type of terminal,
modifying at least one keyword of a non-natural referencing.

17. The method for generating a composite visibility indicator according to claim 15, wherein at least one strategy is generated as a function of data from a neural network having as an input, indicator score data associated with zones and categories, said scores having been previously calculated subsequently to the application of strategies.

18. A non-transitory memory comprising program code instructions for implementing a method for generating a composite visibility indicator of at least one first entity within a data network including connected equipment and storing digital resources designating entities, each entity being accessible from a digital resource locator within the data network, the program code instructions including instructions for:
selecting a first category of entities from a user interface, each category being defined in at least one database of a server of the data network;
selecting a first position from a user interface;
associating said first position with a first geographical zone, said first geographical zone defining a zone around the first position as a function of the selected category;
checking a georeferencing on a digital mapping accessible from a data network of a digital resource locator, said digital resource locator pointing to a resource associated with the first entity;
automatically generating at least one request from a calculator to collect data from at least one remote database and calculating from said data collected and from a calculator:
a first indicator quantifying a set of texts associated with grades of a set of users, said set of texts being digitally associated within a database with the first entity in the first zone, said quantification being performed on a predefined scale, said set of texts associated with grades being generated on at least one data page of the data network of the digital resource locator;
a second indicator of the existence of at least one resource comprising a first web page referencing data associated with the first entity and with at least one position of the first zone or with the first zone;
generating a composite visibility indicator for each entity of the first category selected within the first zone, said visibility indicator being a function of the first indicator and of the second indicator.

19. A terminal comprising a non-transitory memory, a user interface and a communication interface, the non-transitory memory comprising program code instructions for implementing a method for generating a composite visibility indicator of at least one first entity within a data network including connected equipment and storing digital resources designating entities, each entity being accessible from a digital resource locator within the data network, the program code instructions including instructions for:
- selecting a first category of entities from the user interface, each category being defined in at least one database of a server of the data network;
- selecting a first position from the user interface;
- associating said first position with a first geographical zone, said first geographical zone defining a zone around the first position as a function of the selected category;
- checking a georeferencing on a digital mapping accessible from a data network of a digital resource locator, said digital resource locator pointing to a resource associated with the first entity;
- automatically generating at least one request to collect data from at least one remote database and calculating from said data collected:
  - a first indicator quantifying a set of texts associated with grades of a set of users, said set of texts being digitally associated within a database with the first entity in the first zone, said quantification being performed on a predefined scale, said set of texts associated with grades being generated on at least one data page of the data network of the digital resource locator;
  - a second indicator of the existence of at least one resource comprising a first web page referencing data associated with the first entity and with at least one position of the first zone or with the first zone;
- generating a composite visibility indicator for each entity of the first category selected within the first zone, said visibility indicator being a function of the first indicator and of the second indicator.

20. A system comprising at least one terminal and a data server configured to generate a composite visibility indicator of at least one first entity within a data network comprising connected equipment and storing digital resources designating entities, each entity being accessible from a digital resource locator within the data network, said system comprising:
- a user interface of an electronic terminal for
  - selecting a first category of entities, each category being defined in at least one database of a server of the data network, and
  - selecting a first position;
- a calculator of a data server for
  - associating said first position with a first geographical zone, said first geographical zone defining a zone around the first position as a function of the selected category;
  - checking a georeferencing on a digital mapping accessible from a data network of a digital resource locator, said digital resource locator pointing to a resource associated with the first entity;
  - automatically generating at least one request from a calculator to collect data from at least one remote database and calculate from said collected data:
    - a first indicator quantifying a set of texts associated with grades of a set of users, said set of texts being digitally associated within a database with the first entity in the first zone, said quantifying being performed on a predefined scale, said set of texts associated with grades being generated on at least one data page of the data network of the digital resource locator;
    - a second indicator of the existence of at least one resource comprising a first web page referencing data associated with the first entity and with at least one position of the first zone or with the first zone;
- the server being configured to generate a composite visibility indicator for each entity of the first category selected within the first zone, said visibility indicator being a function of the first indicator and of the second indicator.

* * * * *